United States Patent
Anderson et al.

(10) Patent No.: US 10,754,331 B2
(45) Date of Patent: Aug. 25, 2020

(54) CLOUD-BASED ANALYTICS FOR WATER HEATERS

(71) Applicant: Ademco Inc., Golden Valley, MN (US)

(72) Inventors: Peter Anderson, St. Paul, MN (US); Rolf L. Strand, Crystal, MN (US); Adam Myre, Minnetonka, MN (US); Timothy J. Smith, Minneapolis, MN (US); Frederick Hazzard, Ham Lake, MN (US); John D. Mitchell, Maple Grove, MN (US); Adam Foley, Blaine, MN (US); Tony Khosla, Maple Grove, MN (US); Gregory Young, Blaine, MN (US)

(73) Assignee: Ademco Inc., Golden Valley, MN (US)

( * ) Notice: Subject to any disclaimer, the term of this patent is extended or adjusted under 35 U.S.C. 154(b) by 58 days.

(21) Appl. No.: 16/025,414

(22) Filed: Jul. 2, 2018

(65) Prior Publication Data

US 2020/0004231 A1 Jan. 2, 2020

(51) Int. Cl.
*G01R 21/133* (2006.01)
*G05B 23/02* (2006.01)
*G05D 23/19* (2006.01)
*F24H 9/20* (2006.01)

(52) U.S. Cl.
CPC ....... *G05B 23/0205* (2013.01); *F24H 9/2007* (2013.01); *G05D 23/1917* (2013.01); *G05B 2223/04* (2018.08); *G05B 2223/06* (2018.08)

(58) Field of Classification Search
CPC ...... G01R 21/133; G01K 13/02; G05B 15/02; G05B 23/0205; G05B 2223/04; G05B 2223/06; G05F 1/66; F24H 9/2007; F24H 9/2035; F24H 9/2014; F24D 19/1063; G05D 23/1917
See application file for complete search history.

(56) References Cited

U.S. PATENT DOCUMENTS

| | | | |
|---|---|---|---|
| 7,076,373 B1 * | 7/2006 | Munsterhuis | F24H 9/2007 702/51 |
| 8,757,509 B2 | 6/2014 | Anderson et al. | |
| 2013/0040252 A1 * | 2/2013 | Bronson | F24H 1/205 431/14 |
| 2013/0197827 A1 * | 8/2013 | Besore | G06Q 50/06 702/45 |
| 2019/0170396 A1 * | 6/2019 | Azulay | F24F 11/32 |
| 2019/0243396 A1 * | 8/2019 | Sobieski | G05D 23/1904 |
| 2019/0338987 A1 * | 11/2019 | Young | F24H 1/205 |

* cited by examiner

*Primary Examiner* — An T Nguyen
(74) *Attorney, Agent, or Firm* — Shumaker & Sieffert, P.A.

(57) ABSTRACT

A remote water heater monitoring system is configured to communicate with a plurality of client water heaters over a network. The system processes received data related to the operation of the plurality of client water heaters and identifies one or more baseline trends over time related to water heater performance and/or water heater reliability using the received data from one or more of the client water heaters and identifies one or more abnormalities in the operation of a particular one of the client water heaters based on the baseline trends. An alert is generated for one or more of the abnormalities in the operation of the particular one of the client water heaters and is associated with a corresponding client account.

18 Claims, 6 Drawing Sheets

CLOUD-BASED ANALYTICS FOR WATER HEATERS

TECHNICAL FIELD

The present disclosure pertains generally to systems for monitoring water heaters and more particularly to systems for monitoring the health of a plurality of water heaters that are distributed between a number of different buildings.

BACKGROUND

Water heaters are used in homes, businesses and just about any establishment having the need for heated water. A conventional water heater typically has at least one heating element or "heater," such as a gas-fired burner and/or an electric resistive element. Each water heater also typically has at least one thermostat or controller for controlling the heater. The controller often receives signals related to the temperature of the water within the water heater, oftentimes from a temperature sensor that is thermally engaged with the water in the water heater. In some instances, a water heater may operate in accordance with a first temperature set point and a second temperature set point. The difference between the first and second temperature set point may be referred to as the differential of the water heater. When temperature signals from the temperature sensor indicate that the water temperature is below a first set point, the controller turns on the heater and the water within the water heater begins to heat. After some time, the water temperature within the water heater will increase to a second set point, at which point the controller typically causes the heater to reduce its heat output or, alternatively, causes the heater to turn off. This heat cycle begins again when the water temperature within the water heater drops below the first set point.

In general, a water heater has a finite life expectancy. The life expectancy of a water heater may be determined by when the water tank rusts out, and thus starts to leak. The life expectancy of a water heater may be an indication of when other components may begin to fail. In some cases, by monitoring the performance of a water heater, it is possible to ascertain an overall health indication for that water heater. The overall health indication for a particular water heater may be relative to performance data that is compiled for a plurality of water heaters, sometimes within particular geographical regions. A need remains for improved systems for monitoring a plurality of water heaters.

SUMMARY

The disclosure relates generally to systems for monitoring the performance, and hence the health, of a plurality of water heaters that may be distributed between a plurality of different buildings. In some cases, the plurality of water heaters may be distributed within a particular geographical region or area. In some cases, an example of the disclosure is a remote water heater monitoring system that is configured to communicate with a plurality of client water heaters over a network, where each of the client water heaters services a corresponding client building. The remote water heater monitoring system includes a plurality of client accounts wherein each of the client water heaters is associated with a particular client account. The remote water heater monitoring system includes a communications port that is configured to operatively communicate with a plurality of client water heaters, and to receive data related to the operation of a plurality of client water heaters. The remote water heater monitoring system includes a memory for storing the received data related to the operation of the plurality of client water heaters as well as a controller that is operatively coupled to the memory.

The controller includes a processor for processing at least some of the received data related to the operation of the plurality of client water heaters and to identify one or more baseline trends over time related to water heater performance and/or water heater reliability using the received data from two or more of the client water heaters. Based on the identified one or more baseline trends, the processor is configured to identify one or more abnormalities in the operation of a particular one of the client water heaters using the received data, generate an alert for one or more of the abnormalities in the operation of the particular one of the client water heaters, associate the alert with the client account that corresponds to the particular one of the client water heaters, and provide access to the alert via the client account that corresponds to the particular one of the client water heaters.

Another example of the disclosure is a remote water heater monitoring system that is configured to communicate with a plurality of client water heaters over a network, where each of the client water heaters services a corresponding client building and the remote water heater monitoring system includes a plurality of client accounts wherein each of the client water heaters is associated with a particular client account. The remote water heater monitoring system includes a communications port that is configured to operatively communicate with a plurality of client water heaters, and to receive data related to the operation of a plurality of client water heaters, and a memory for storing the received data related to the operation of the plurality of client water heaters. A controller is operatively coupled to the memory and includes a processor for processing at least some of the received data related to the operation of the plurality of client water heaters and to identify one or more baseline health parameters over time using the received data from two or more of the client water heaters and, based on the identified one or more baseline health parameters, to identify an indication of health of a particular one of the client water heaters using the received data. The processor is configured to generate an alert for the particular one of the client water heaters when the indication of health meets one or more alert conditions, to associate the alert with the client account that corresponds to the particular one of the client water heaters and to provide access to the alert via the client account that corresponds to the particular one of the client water heaters.

Another example of the disclosure is a remote water heater monitoring system that includes a communications port for sending and/or receiving data related to operation of two or more water heaters over a network, a memory for storing the received data related to the operation of the two or more water heaters and a controller that is operatively coupled to the communications port and the memory. The controller processes the received data related to the operation of the two or more water heaters to identify one or more trends over time related to water heater performance and/or water heater reliability, and based on the identified one or more trends, identify for a particular water heater one or more of: (1) an abnormality in the operation of the particular water heater using the received data; and (2) a suggested action to improve the performance of the particular water heater using the received data. The controller generates an alert when an abnormality is identified in the operation of the particular water heater and associates the alert with a client account of the remote water heater monitoring system that corresponds to the particular water heater, and provides access to the alert via the client account that corresponds to the particular water heater.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
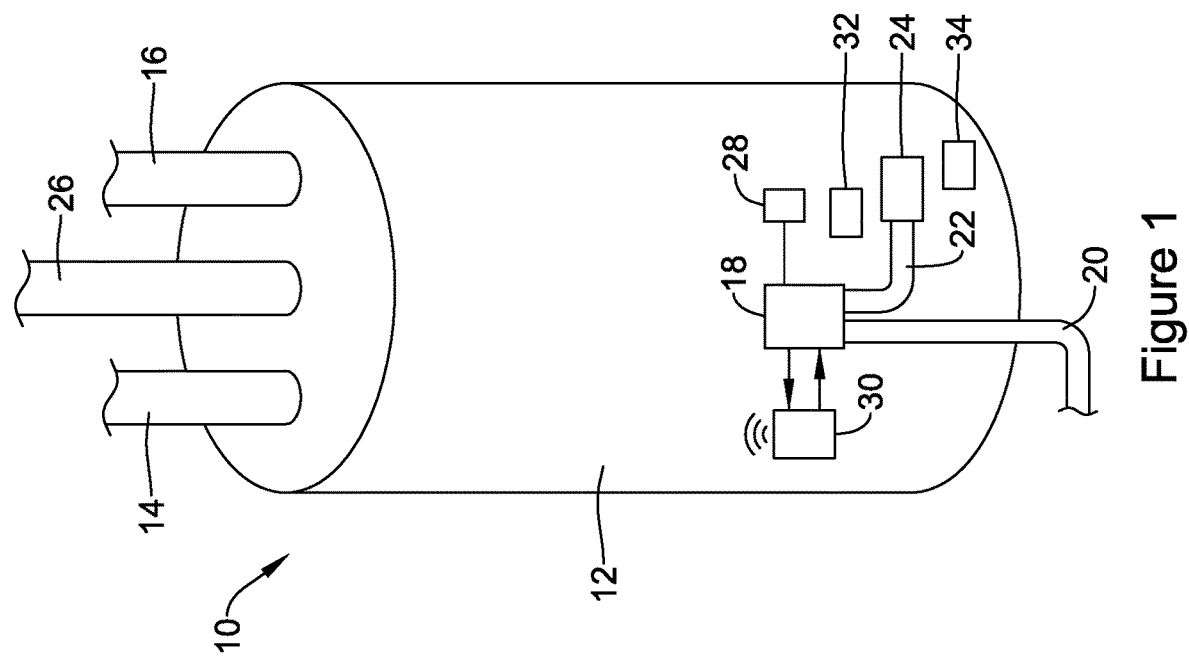
FIG. 1 is a schematic view of an illustrative water heater.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 provides a schematic view of an illustrative but non-limiting water heater 10. Water heater 10 includes a water tank 12. The water tank 12 may include an insulating layer (not explicitly shown) positioned about the water tank 12 to help reduce thermal losses from the water tank 12. Cold water enters the water tank 12 through a cold water line 14 and is heated by a gas burner 24. In some cases, the water heater 10 may include an electric heating element rather than a gas burner 24. In any event, the resulting heated water exits through a hot water line 16. A gas control unit 18 regulates gas flow from a gas source 20 through a combustion gas line 22 and into the gas burner 24. A flue 26 permits combustion byproducts to safely exit. A temperature sensor 24 provides the gas control unit 18 with an indication of a current water temperature within the water tank 12. In some cases, the water heater 10 includes a flame sensor 28 that provides verification that a flame is present.

In some cases, the water heater 10 may include a controller 30 that is operably coupled with the gas control unit 18 such that the controller 30 may regulate operation of the gas control unit. In some cases, the water heater 10 may include a thermopile 32 that is operably coupled to a flame produced by the gas burner 24 to provide electrical power for operation of the controller 30, for example. In some cases, as will be discussed, a voltage measured across the thermopile 32 may be an indication of the relative health of the thermopile 32. In some cases, the water heater 10 may include a pilot light as a source of ignition for lighting the gas burner 24. In some instances, the water heater 10 may include a hot surface ignitor 34 for lighting the flame produced by the gas burner 24. In some cases, as will be discussed, an impedance of the hot surface ignitor 34 may be an indication of the relative health of the hot surface ignitor 34.

In some cases, the controller 30 may be configured to be able to communicate with other devices. For example, the controller 30 may be configured to communicate wirelessly with a router or modem within a building, and thus can communicate over a network such as but not limited to the Internet. In some instances, the controller 30 may be configured to measure or otherwise collection information pertaining to one or more performance parameters of the water heater 10. Illustrative but non-limiting examples of such performance parameters include elapsed burner run time, an inlet water temperature, a voltage across a thermopile, impedance of a hot surface ignitor, and the like. In some cases, the controller 30 may include a memory so that the controller 30 is able to store performance data over time. In some instances, the controller 30 periodically communicates stored performance data to a remote device or location for analysis.

In some cases, the performance of a number of water heaters may be remotely monitored in order to predict possible water heater failures, to determine when replacement of a particular water heater is warranted, to provide diagnostic information and appropriate remedial courses of action, and the like. In some instances, and in some jurisdictions, individual water heaters may not be owned by individual building or homeowners, but may instead be leased by the individual building or homeowners while ownership of the individual water heaters remains with a company that leases out the water heaters. It will be appreciated that a company that leases out a number of water heaters may have a desire to monitor the performance and health of the water heaters in order to be more proactive. As a result, the company may have a better idea if a particular water heater may be underperforming relative to expectations, or may be about to fail. In some cases, the performance of an individual water heater may be compared to the collected performance of a number of water heaters that are the same brand and model, or are installed in a similar geographic region, or perhaps are have a similar installation date.

Figure 2:
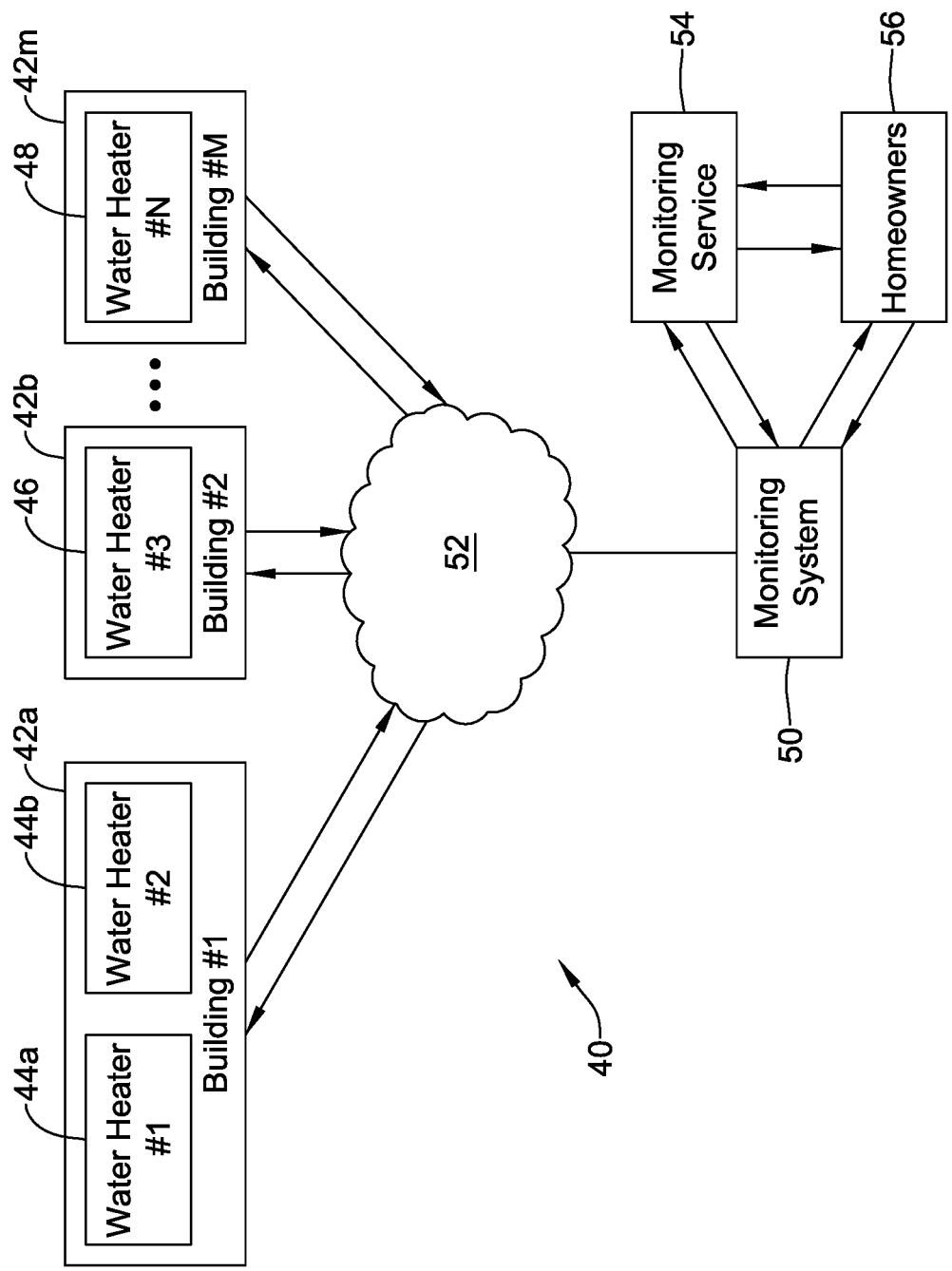
FIG. 2 is a schematic block diagram of a system for monitoring a plurality of water heaters.

FIG. 2 shows a system 40 in which a number of buildings 42a, 42b and so on through 42m each have one or more water heaters installed in the building. As illustrated, the building 42a includes a first water heater 44a and a second water 44b, the building 42b includes a third water heater 46 and the building 42m includes an Nth water heater 48. It will be appreciated that in some cases, the building 42a may include more than two water heaters 44a, 44b, the building 42b may include two, three, or more water heaters, and so on. The water heaters 44a, 44b, 46, 48 may be considered as being representative of the water heater 10 shown in FIG. 1.

For purposes of illustration in FIG. 2, the water heaters are labeled sequentially as water heater #1 through water heater # N while the buildings are labeled sequentially as building #1 through building # M. In some cases, the building 42a may have a water heater #1 and a water heater #2, the building 42b may have a water heater #1 (if only one water heater in the building), and so on, with the building 42m having a water #2. In some cases, each water heater in each building may not have a sequential identifier as such, but may instead each have a unique identifier such as a serial number assigned to each water heater.

The system 40 includes a remote water heater monitoring system 50 that is able to communicate with each of the water heaters 44a, 44b, 46 and 48 through a cloud-based interface 52. In some cases, the cloud-based interface 52 may be an example or a manifestation of the Internet, allowing the controller 30 of each of the water heaters 44a, 44b, 46 and 48 to communicate over a series of servers and thus reach the remote water heater monitoring system 50. In some cases, as will be appreciated, the remote water heater monitoring system 50 may itself be scrutinized or monitored by a monitoring service 54. In some cases, the monitoring service 54 may represent one or more individuals who monitor an output from the remote water heater monitoring system 50. In some cases, the monitoring service 54 may instead be manifested in software, and may be considered as being part of the remote water heater monitoring system 50. In some cases, the remote water heater monitoring system 50 and/or the monitoring service 54 may communicate directly with a homeowner or other building owner 56. This communication may include, for example, a suggestion that the homeowner 56 arrange service, plan to replace their water heater soon, or a request that the homeowner 56 either perform or arrange to have a professional perform suggested maintenance on the water heater.

In some cases, communication between a particular client water heater and the remote water heater monitoring system 50 may enable the particular client water heater to be operated in accordance with a setback schedule. In some instances, the remote water heater monitoring system 50 may be configured to communicate with a corresponding HVAC controller located in the building corresponding to a particular client water heater, such as via the TOTALCONNECT® service. It will be appreciated that if the home's HVAC controller operates in accordance with a time-based programmed schedule, or operates in accordance with a location-based geofencing schedule, there will be periods of time during which the home may be unoccupied, and the home may be allowed to drift to a temperature that is below a comfort heating temperature, or perhaps above a comfort cooling temperature. While a water heater cools more slowly than a home, and perhaps does not heat as quickly, it will be appreciated that energy savings may achieved by allowing the water heater temperature to drift below a normal setpoint temperature when the home is empty and no hot water is needed.

In some cases, the remote water heater monitoring system 50 may also be used for power system load leveling. For example, the remote water heater monitoring system 50 may instruct particular water heaters within a geographic region to heat for a first period of time while other particular water heaters within that same geographic region may be instructed to not heat during the first period of time but to wait and heat during a subsequent second period of time. In another example, perhaps temperature setpoints may be varied among different water heaters in a particular area in order to better load level power demands on the power system, whether the power system be a gas system or an electrical system.

Figure 3:
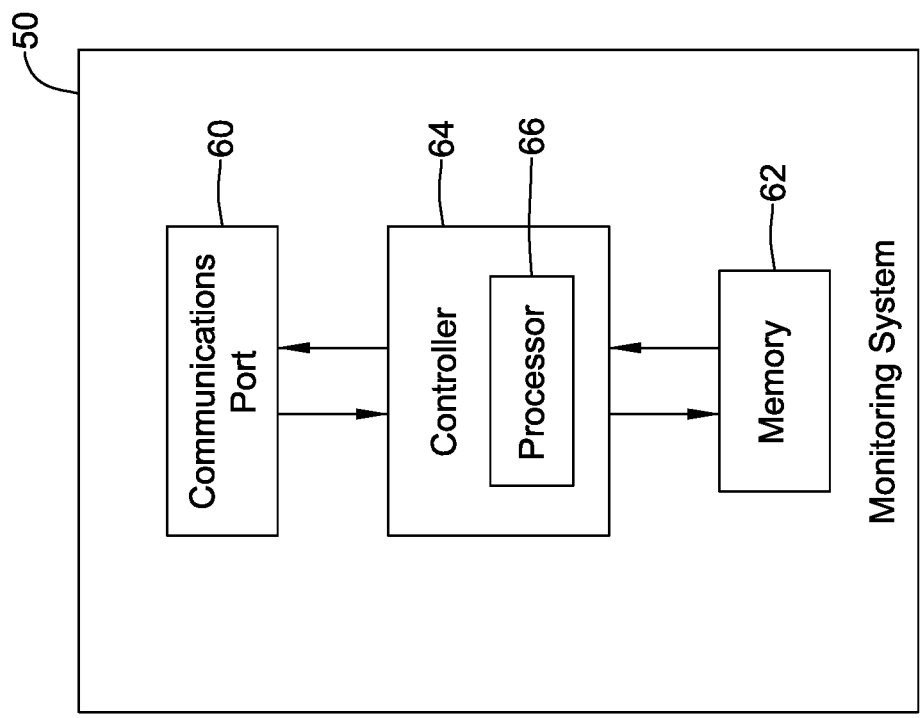
FIG. 3 is a schematic block diagram of an illustrative monitoring system that forms a part of the system of FIG. 2.

FIG. 3 is a schematic block diagram of the remote water heater monitoring system 50. The remote water heater monitoring system 50 includes a communications port 60 that is configured to operatively communicate with a plurality of client water heaters, such as but not limited to the water heaters 44a, 44b, 46 and 48 shown in FIG. 2. The communications port 60 may be configured to receive data that is related to the operation of the client of client water heaters. The remote water heater monitoring system 50 includes a memory 62 for storing the received data. A controller 64 may be operably coupled to the memory 62 and may include a processor 66 for processing at least some of the received data that is related to the operation of the plurality of client water heaters.

Figure 4:
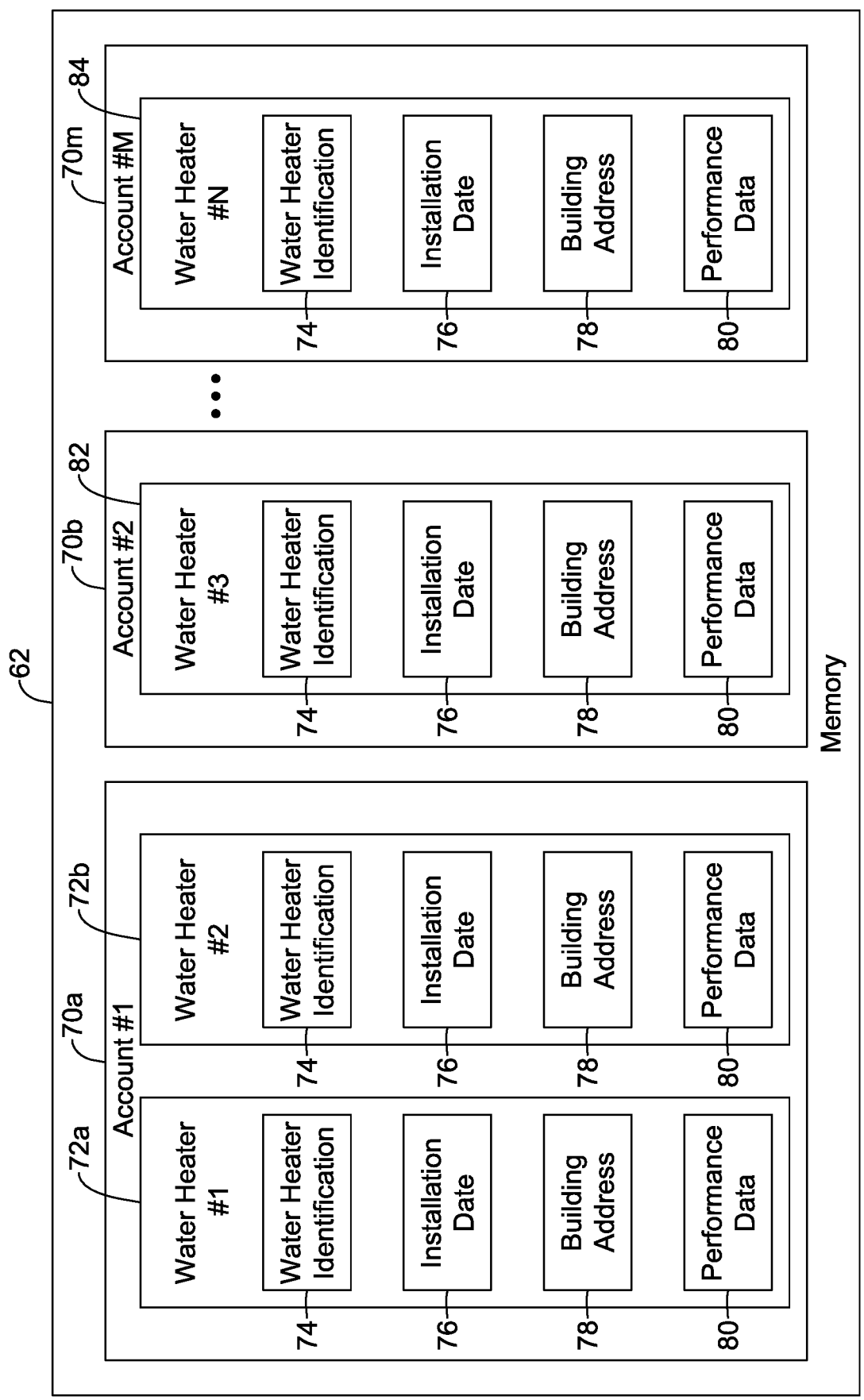
FIG. 4 is a schematic block diagram of a portion of the illustrative monitoring system of FIG. 3.

FIG. 4 is a schematic block diagram of the memory 62, providing an illustrative but non-limiting example of how particular data may be organized within the memory 62. It will be appreciated that this is merely illustrative, as the remote water heater monitoring system 50 may organize the data in any logical format. As illustrated, the memory 62 may include a client account 70a, a client account 70b and on through a client account 70m. The client account 70a may correspond to the building 42a (FIG. 2) that includes a water heater 44a and a water heater 44b. Since the building 42a includes two water heaters 44a and 44b, the client account 70a includes a water heater folder 72a that provides data pertaining to the water heater 44a and a water heater folder 72b that provides data pertaining to the water heater 44b. In some cases, and as an illustration, each of the water heater folders 72a and 72b may each include water heater identification 74, installation date 76, building address 78 and performance data 80. Each of the water heater folders 72a and 72b may also include additional data, and in some cases some of the data, such as but not limited to the performance data 80, may itself be organized into sub-folders. As can be appreciated, the client account 70b includes a water heater folder 82 corresponding to the water heater 46 in the building 42b and on through the client account 70m, which includes a water heater folder 84 that corresponds to the water heater 48 in the building 42m.

Returning to FIG. 3, the controller 64 and/or the processor 66 may be configured to identify one or more baseline trends over time related to water heater performance and/or water heater reliability using the received data from two or more of the client water heaters. In some instances, the controller 64 may monitor performance of a single client water heater in order to detect a decline in the performance of that particular client water heater. In some cases, and based on the identified one or more baseline trends, the controller 64 and/or the processor 66 may identify one or more abnormalities in the operation of a particular one of the client water heaters (such as the water heaters 44a, 44b, 46, 48) using the received data. The controller 64 and/or the processor 66 may generate an alert for one or more of the abnormalities in the operation of the particular one of the client water heaters as well as associating the alert with a client account (as will be discussed) that corresponds to the particular one of the client water heaters. In some cases, the controller 64 and/or the processor 66 may provide access to the alert via the client account that corresponds to the particular one of the client water heaters.

In some cases, the alert is a preemptive alert that predicts a future failure of one or more components of the particular one of the client water heaters. As an example, the received data may include a voltage across a thermopile (such as the thermopile 32 shown in FIG. 1), and the controller 64 may recognize a degradation of the voltage across the thermopile 32 over time, and may estimate an end of life of the thermopile 32. In some cases, the controller 64 may estimate an effective remaining life expectancy of the thermopile 32, and may provide an alert to the homeowner 56 (FIG. 2) that they need to replace or arrange to have someone replace the thermopile 32 within a particular time frame. As another example, the received data may include an impedance across a hot surface ignitor (such as the hot surface ignitor 34 shown in FIG. 1), and the controller 64 may recognize a degradation of the impedance of the hot surface ignitor 34 over time, and may estimate an end of life of the hot surface ignitor 34. In some cases, the controller 64 may estimate an effective remaining life expectancy of the hot surface ignitor 34, and may provide an alert to the homeowner 56 (FIG. 2) that they need to replace or arrange to have someone replace the hot surface ignitor 34 within a particular time frame.

In some cases, a hot surface ignitor such as the hot surface ignitor 34 may be switched on and off using a relay. In some cases, an electronic control circuit may be used to control the hot surface ignitor 34, and in some instances the electronic control circuit may be in communication with the controller 64 such that the remote water heater monitoring system 50 is at least able to monitor the condition of the hot surface ignitor 34, if not actually regulating operation of the hot surface ignitor 34. In an example, a transistor such as a FET (field effect transistor) may be used to rapidly switch the power on/off to the hot surface ignitor 34. The on/off duty cycle could be used to provide an optimum level of power to the hot surface ignitor 34 and/or to control the temperature rise of the hot surface ignitor 34 to an optimum rate until an optimal temperature to ignite the gas is reached. The control could then hold the temperature of the hot surface ignitor 34 constant until the gas is ignited. Power level and temperature rise could be controlled by PWM (pulse width modulation) duty cycle. In some cases, the feedback would allow the control to determine the earliest time at which the gas valve 18 could be safely opened, which helps prevent the hot surface ignitor 34 from being powered any longer than necessary, thereby extending its life.

In some cases, when the water heater 10 is installed, or perhaps when the hot surface ignitor 34 is replaced, the control circuitry for the hot surface ignitor 34 can create a performance baseline for the hot surface ignitor 34. In some cases, a new performance baseline may be created when the control circuitry (or the controller 64) sees a sudden favorable change in performance, as this is generally caused by installation of a new hot surface ignitor 34. As the hot surface ignitor 34 ages, its performance may be compared to that performance baseline in order to ascertain the relative health of the hot surface ignitor 34. This comparison may be done by the control circuitry, or can be done by the controller 64. It will be appreciated that when looking at resistance versus time, the hot surface ignitor 34 when new will have a much faster rate of change, meaning that the controller 64 can estimate the effective age or health of the hot surface ignitor 34 by looking at how quickly resistance increases relative to time, particularly when the hot surface ignitor 34 is first powered.

In some cases, the controller 64 may instead monitor a length of time it takes for the hot surface ignitor 34 to ignite the gas. Once the gas has been ignited, ignition may be quickly proven using a flame sensor. As the impedance increases, it will take longer for the hot surface ignitor 34 to reach a temperature at which the gas ignites. Accordingly, in some cases measuring the time until the gas has ignited provides a quicker, easier way to detect aging of the hot surface ignitor 34. As the hot surface ignitor 34 ages and accumulates contaminants, resistance and rate of temperature change will be impacted. The controller 64 can monitor these values, and can provide notification of when replacement of the hot surface ignitor 34 may be warranted. In some cases, a flame current sensed by the flame sensor 28 may be monitored. As residue builds up on the flame sensor 28, the current decreases. The controller 64 may instruct a homeowner, for example, when to clean or replace the flame sensor 28 before the water heater 10 fails to operate.

In some cases, the controller 64 identifies baseline trends by identifying statistically significant trends over time in the received data from a large number of similar water heaters. In some instances, a large number of similar water heaters may refer to water heaters that are of the same make and model, are of about the same installed age, or are in a particular geographical area. In some cases, the controller 64 identifies baseline trends within data from a statistically significant number of different water heaters. If the data is relatively consistent, fewer samples may be needed to ascertain a baseline trend. If the data is less consistent, more samples may be needed. In some cases, the controller 64 utilizes the received data from at least 10, 20, 30, 40, 50 or more different water heaters.

In some cases, because different geographical areas have unique water supplies, it can be useful to look at groups of water heaters in a particular region. For example, some regions have relatively hard water, which can shorten the life of a water heater. Other regions have relatively softer water, and thus water heaters in these regions may last for a longer period of time. In some cases, the controller 64 may determine a first baseline trend that is identified using received data from two or more of the client water heaters located in a first geographical region and is used to identify one or more abnormalities in the operation of a particular one of the client water heaters in the first geographical region. The controller 64 may determine a second baseline trend that is identified using received data from two or more of the client water heaters located in a second geographical region and is used to identify one or more abnormalities in the operation of a particular one of the client water heaters in the second geographical region. It will be appreciated that the controller 64 may determine baseline trends for any number of different geographical regions. In some cases, the controller 64 may also determine that a particular geographic region may have a significant trend based upon the data.

In some cases, the controller 64 may determine a first baseline trend that is identified using received data from two or more of the client water heaters of a first model of water heater and is used to identify one or more abnormalities in the operation of a particular one of the client water heaters of the first model of water heater. The controller 64 may also determine a second baseline trend that is identified using received data from two or more of the client water heaters of a second model of water heater and is used to identify one or more abnormalities in the operation of a particular one of the client water heaters of the second model or water heater. It will be appreciated that the controller 64 may determine baseline trends for any number of different water heater models.

In some cases, the controller 64 may be configured to determine a first baseline trend that is identified using received data from two or more of the client water heaters of a first age category and is used to identify one or more abnormalities in the operation of a particular one of the client water heaters of the first age category. The controller 64 may also be configured to determine a second baseline trend that is identified using received data from two or more of the client water heaters of a second age category and is used to identify one or more abnormalities in the operation of a particular one of the client water heaters of the second age category.

In some cases, the controller 64 may further drill down in determining baseline trends by combining categories. For example, the controller 64 may determine one or more baseline trends by looking at data from water heaters in a particular geographical region, but separating out within that geographical region into water heaters of a particular make and/or model, or perhaps into water heaters that were installed at about the same time. This is just an example. In some cases, the controller 64 may be configured to estimate an end of life for the particular one of the client water heaters based at least in part on the identified one or more baseline trends and the received data from the particular one of the client water heaters.

The controller 64 may utilize these baseline trends in estimating the life expectancy of a particular water heater, or perhaps in estimating the life expectancy of a particular component of a particular water heater. For example, in looking at thermopile voltage of a particular water heater in comparison with a baseline trend of thermopile voltage for a large number of similar (make/model, installation date and/or geographical region) water heaters, if the thermopile voltage for that particular water heater is substantially lower than that of similar water heaters, the controller 64 may make a determination that the thermopile may be failing in that particular water heater. Similarly, in looking at hot surface ignitor impedance of a particular water heater in comparison with a baseline trend of hot surface ignitor impedance for a large number of similar (make/model, installation date and/or geographical region), if the hot surface ignitor impedance shows a degradation relative to that of similar water heaters, the controller 64 may make a determination that the hot surface ignitor may be failing in that particular water heater. These are just examples.

In some cases, a particular client water heater may have a powered damper disposed within the flue, or may alternatively have an exhaust blower that forces exhaust gases out through the flue. In some cases, the controller 64 may monitor the damper motor and/or blower motor power draw over time, and may compare to that of similar water heaters having powered dampers or blower motors in order to ascertain and/or monitor the relative health of the damper motor and/or the exhaust blower motor. It will be appreciated that as the motor wears, the power draw will increase. In some instances, if the damper motor or the exhaust blower motor is an AC motor, a power factor of the motor may be calculated (such as by the controller 64) by monitoring voltage and current signals. As an AC motor wears, the power factor will change over time. In some cases, if the damper motor is a DC motor, such as with a milli-volt operated damper, then DC voltage and current can be monitored in order to determine changes in the motor load. In some cases, particularly for an exhaust blower, the controller 64 may also monitor the time needed to close a pressure switch, as increasing time is an indication that the motor was working harder to create enough air flow to create enough pressure to close the pressure switch. In some cases, the controller 64 may also monitor the time to open or close the damper, in order to ascertain and/or monitor the relative health of the damper motor, particularly relative to similar powered water heaters.

For water heaters with a powered flue damper, failure of the damper motor may mean that the water heater is forced to shut down until the damper motor is repaired or replaced. In some cases, a water heater with a powered flue damper may include a mechanical service switch that may be installed on the damper to force the damper motor to open the damper and allow the water heater to continue functioning. In some cases, it may be possible to instead manually move the damper into an open position. In some cases, if the water heater reports the damper failure to the controller 64, the controller 64 may send a message via the remote water heater monitoring system 50 to the homeowner 56, instructing them to perform a user intervention. The user intervention may, for example, include a specific sequence of turns on the control knob in order to acknowledge the damper failure, followed by manually opening the damper. In some cases, to encourage the user to arrange service, the water heater may shut down again after a predetermined length of time (say a week). In some cases, the user may be expected to arrange service to repair or replace the damper motor. Alternatively, the remote water heater monitoring system 50 may instead arrange service through the monitoring service 54.

In some cases, the controller 64 may be configured to communicate one or more commands to a particular client water heater via the communications port 60. In some instances, for example, the controller 64 may be configured to communicate one or more troubleshooting commands. When the controller 64 determines that the water heater performance and/or reliability of a particular client water heater is reduced, the controller 64 may communicate one or more operational commands that are designed to improve the performance and/or reliability of the particular client water heater. As an example, a particular client water heater may operate in accordance with a set point dead band defined by a lower temperature threshold and an upper temperature threshold, where the particular client water heater activates a burner of the client water heater to heat water in a water tank of the client water heater when the water temperature falls to the lower temperature threshold and deactivates the burner when the water temperature reaches the upper temperature threshold. In some cases, an operation command intended to improve water heater performance and/or water heater reliability may include an operation command to raise the lower temperature threshold of the set point dead band. In other words, if the water heater is not heating quickly enough, one solution is to not let the water in the water heater cool down as far before reheating.

In some cases, the controller 64 may limit how far the lower temperature threshold of the set point dead band is allowed to increase.

The controller 64 may be configured to estimate water usage through the particular one of the client water heaters based at least in part on received data from the particular one of the client water heaters. For example, in some cases, the controller 64 may be configured to estimate water usage through the particular one of the client water heaters based at least in part on an elapse burner run time of the particular one of the client water heaters. In some instances, the controller 64 estimates water usage through the particular one of the client water heaters based at least in part on an elapse burner run time and an inlet water temperature of the particular one of the client water heaters, as it will be appreciated that elapse burner run time may also be impacted by the temperature of the cold water entering the water heater. A relatively long elapse burn time may, for example, be indicative of high water usage or relatively colder water entering the water heater.

In some cases, the controller 64 may use the baseline trends to recognize other abnormalities in a particular client water heater. For example, in some cases, a water leak may be suspected by the controller 64 if a particular client water heater exhibits a repeated number of short burner cycles and/or a higher than expected decay in water temperature in the water tank of the particular client water heater. It will be appreciated that if the water heater has a leak, that increases the inflow of cold water into the water heater even if there is no demand for hot water within the building. As a small amount of cold water flows in, the overall water temperature will drop until it reaches a setpoint at which point the water heater starts to heat again. Once temperature has been reached, the burner will shut down. As water leaks out, the cycle repeats itself, hence the repeated short burner cycles. In some cases, these repeated short burner cycles may occur at regular time intervals, which can be another indication of a possible leak.

In some cases, the controller 64 may process the received data related to the operation of the two or more water heaters to identify one or more trends over time related to water heater performance and/or water heater reliability, and based on the identified one or more trends, identify for a particular water heater one or more of: (1) an abnormality in the operation of the particular water heater using the received data; and (2) a suggested action to improve the performance of the particular water heater using the received data. In some cases, the controller 64 may identify for a particular water heater a suggested course of action in order to improve the performance of the particular water heater and/or to decrease the cost of operation. For example, in some locations gas and/or electricity costs may vary depending on time of day, with peak time periods being more expensive. In some cases, it may be possible to shift water heating into low demand periods of time.

Illustrative but non-limiting examples of suggested actions may include power cycling the particular water heater, removing particular matter from the particular water heater, removing debris from a flue of the particular water heater, manually setting a flue damper to an open position, replacing an anode rod of the particular water heater, replacing a hot surface ignitor of the particular water heater, replacing a thermopile of the particular water heater, replacing a gas valve of the particular water heater, replacing a damper actuator of the particular water heater, and replacing the particular water heater with another water heater. As will be appreciated, some of these activities, such as power cycling the water heater, may be remotely commanded. Others of these activities may require physical attention to the particular water heater, whether by the homeowner 56 (FIG. 2) or by a service professional contacted by the monitoring service 54 or by the homeowner.

Figure 5:
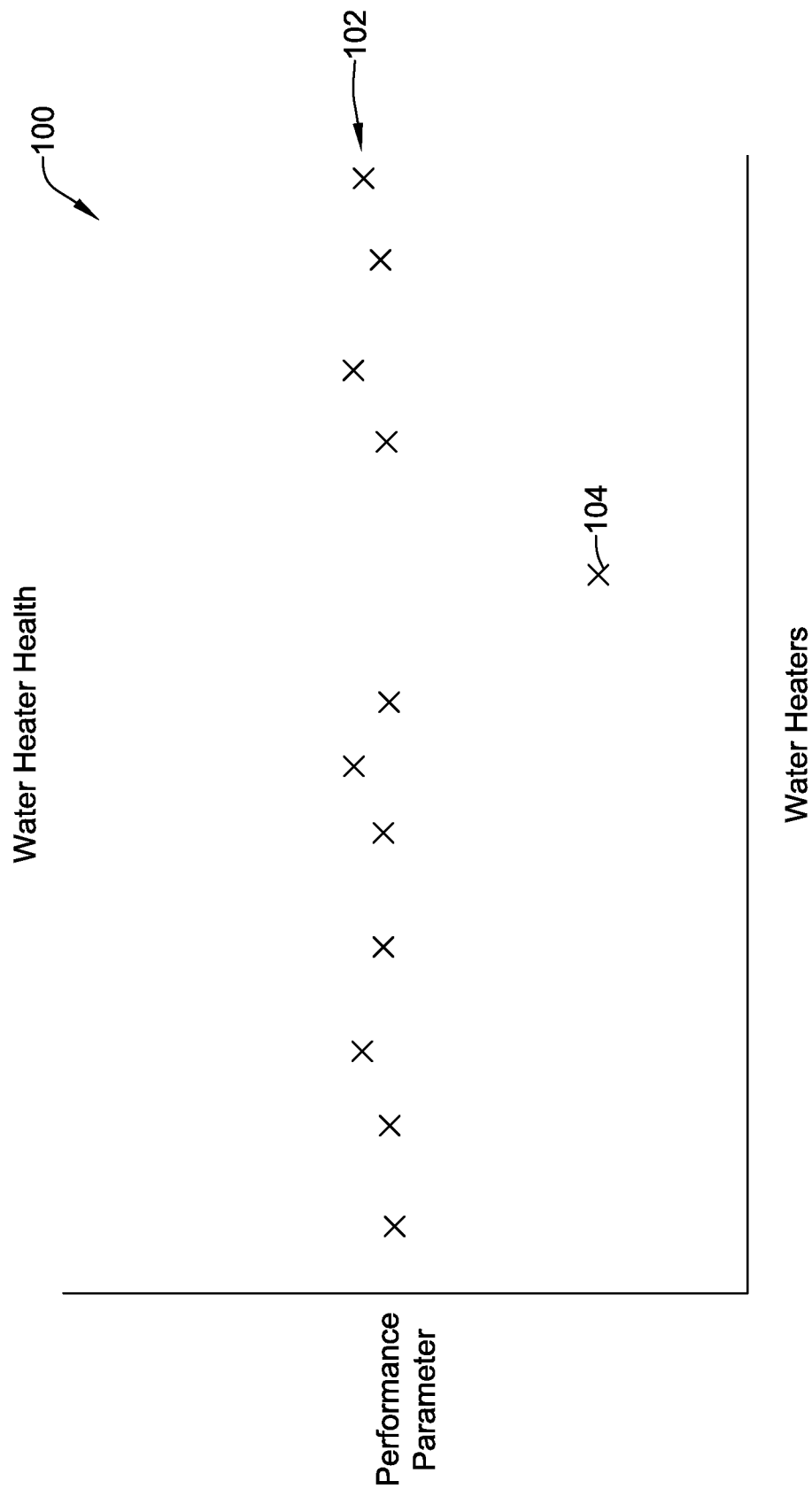
FIG. 5 is a schematic graphical representation of water heater health information ascertainable by the illustrative monitoring system of FIG. 3.

FIG. 5 is a schematic graphical representation of data that the controller 64 may use in comparing a particular client water heater to a baseline trend. FIG. 5 is a graph 100 showing a performance parameter along the Y axis and individual water heaters plotted along the X axis. Each water heater is represented by an x on the graph. The performance parameter may be any performance parameter, be it thermopile voltage, hot surface ignitor impedance, burn cycle, and so on. As can be seen, most of the water heaters have a similar value for the graphed performance parameter, as indicated by a data grouping 102. One water heater, indicated by data point 104, may be seen as being an outlier relative to the data grouping 102. This may mean that the particular water heater indicated by the data point 104 is not working well. In some cases, this may just be a temporary aberration. In response, the controller 64 may send a command to that water heater to turn its burner on and off one or more times, and then resend the relevant data. If the problem persists, the controller 64 may set an alert for that water heater.

Figure 6:
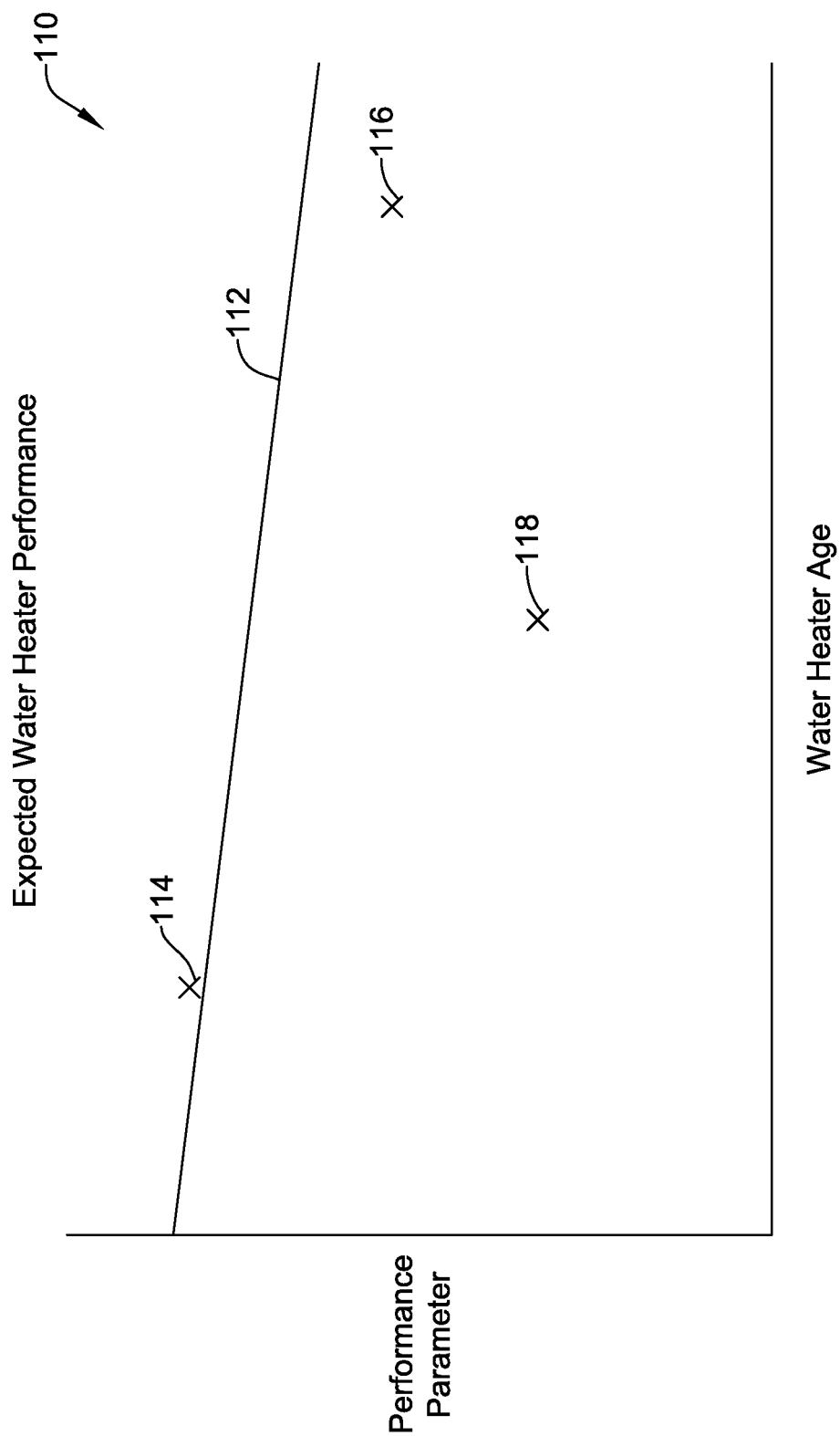
FIG. 6 is a schematic graphical representation of water heater health information ascertainable by the illustrative monitoring system of FIG. 3.

FIG. 6 is a schematic graphical representation of data that the controller 64 may use in comparing a particular client water heater to other water heaters. FIG. 6 is a graph 110 showing a performance parameter along the Y axis and water heater age along the X axis. A trendline 112 represents a statistical average for the displayed performance parameter relative to water heater age. As can be seen, the trendline 112 has a negative slope, indicating an expected decline in performance as water heaters age. Data point 114 represents a water heater whose performance is just above the expected for a water heater of its age while a data point 116 represents a water heater whose performance is just below the expected for a water heater of its age. A data point 118 represents a water heater whose performance is well below what would be expected for a water heater of its age. In some cases, the controller 64 may more closely monitor the performance of the water heater represented by the data point 116, awaiting further possible decline. In some instances, the controller 64 may set an alert for the water heater indicated by the data point 118.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A remote water heater monitoring system comprising:
   a communications port configured to operatively communicate with a plurality of client water heaters over a network, and to receive data related to the operation of a plurality of client water heaters, wherein the received data includes an impedance of a hot surface ignitor of a client water heater of the plurality of client water heaters, the hot surface ignitor configured to ignite a flame of the client water heater, wherein each of the client water heaters services a corresponding client building, and wherein each of the client water heaters is associated with a particular client account of a plurality of client accounts;
   a memory configured to store the received data related to the operation of the plurality of client water heaters;

a controller operatively coupled to the memory, wherein the controller includes a processor for processing at least some of the received data related to the operation of the plurality of client water heaters and to:

identify one or more baseline trends over time related to at least one of: water heater performance or water heater reliability using the received data from two or more of the client water heaters;

based on the identified one or more baseline trends, identify one or more abnormalities in the operation of at least a particular one of the client water heaters using the received data;

identify a degradation of the impedance of the hot surface ignitor of the client water heater over time;

estimate an end of life of the hot surface ignitor;

generate an alert for one or more of the abnormalities in the operation of at least the particular one of the client water heaters;

associate the alert with the client account that corresponds to at least the particular one of the client water heaters;

provide access to the alert via the client account that corresponds to at least the particular one of the client water heaters; and communicate one or more commands to at least the particular client water heater via the communications port, wherein the one or more commands include one or more operational commands that raises or lowers a temperature threshold for at least the particular client water heater.

2. The remote water heater monitoring system of claim 1, wherein the controller is further configured to estimate an end of life for the particular one of the client water heaters based at least in part on the identified one or more baseline trends and the received data from the particular one of the client water heaters.

3. The remote water heater monitoring system of claim 1, wherein the alert is a preemptive alert that predicts a future failure of one or more components of the particular one of the client water heaters.

4. The remote water heater monitoring system of claim 1, wherein the one or more baseline trends are identified by identifying statistically significant trends over time in the received data from a plurality of different client water heaters.

5. The remote water heater monitoring system of claim 1, wherein the one or more baseline trends include:

a first baseline trend that is identified using received data from two or more of the client water heaters located in a first geographical region and is used to identify one or more abnormalities in the operation of a particular one of the client water heaters in the first geographical region; and a second baseline trend that is identified using received data from two or more of the client water heaters located in a second geographical region and is used to identify one or more abnormalities in the operation of a particular one of the client water heaters in the second geographical region.

6. The remote water heater monitoring system of claim 1, wherein the one or more baseline trends include:

a first baseline trend that is identified using received data from two or more of the client water heaters of a first model of water heater and is used to identify one or more abnormalities in the operation of a particular one of the client water heaters of the first model of water heater; and a second baseline trend that is identified using received data from two or more of the client water heaters of a second model of water heater and is used to identify one or more abnormalities in the operation of a particular one of the client water heaters of the second model or water heater.

7. The remote water heater monitoring system of claim 1, wherein the one or more baseline trends include:

a first baseline trend that is identified using received data from two or more of the client water heaters of a first age category and is used to identify one or more abnormalities in the operation of a particular one of the client water heaters of the first age category; and a second baseline trend that is identified using received data from two or more of the client water heaters of a second age category and is used to identify one or more abnormalities in the operation of a particular one of the client water heaters of the second age category.

8. The remote water heater monitoring system of claim 1, wherein the one or more commands include one or more troubleshooting commands.

9. The remote water heater monitoring system of claim 1, wherein the controller is further configured to detect a reduction in water heater performance and/or water heater reliability of a particular client water heater, and wherein the one or more commands include the one or more operational commands configured to improve water heater performance and/or water heater reliability communicated in response to detecting a reduction in water heater performance and/or water heater reliability.

10. The remote water heater monitoring system of claim 9, wherein the particular client water heater operates in accordance with a set point dead band defined by a lower temperature threshold and an upper temperature threshold, wherein the particular client water heater activates a burner of the client water heater to heat water in a water tank of the client water heater when the water temperature falls to the lower temperature threshold and deactivates the burner when the water temperature reaches the upper temperature threshold, and wherein the one or more operational commands configured to improve water heater performance and/or water heater reliability comprises an operation command to raise the lower temperature threshold of the set point dead band.

11. The remote water heater monitoring system of claim 1, wherein the controller is configured to estimate water usage through the particular one of the client water heaters based at least in part on received data from the particular one of the client water heaters.

12. The remote water heater monitoring system of claim 11, wherein the controller is configured to estimate water usage through the particular one of the client water heaters based at least in part on an elapse burner run time of the particular one of the client water heaters.

13. The remote water heater monitoring system of claim 11, wherein the controller is configured to estimate water usage through the particular one of the client water heaters based at least in part on an elapse burner run time and an inlet water temperature of the particular one of the client water heaters.

14. The remote water heater monitoring system of claim 1, wherein the one or more abnormalities includes a water leak in a particular one of the client water heaters, wherein the water leak is detected by repeated short burner cycles and/or a higher than expected decay rate in water temperature in a water tank in the particular one of the client water heaters between burner on times.

15. The remote water heater monitoring system of claim 1, wherein the particular one of the client water heaters includes a thermopile operatively coupled to a flame of the particular one of the client water heaters to provide electrical power to the particular one of the client water heaters, and wherein the received data comprises a voltage across the thermopile, and wherein the controller is configured to identify a degradation of the voltage across the thermopile over time and to estimate an end of life of the thermopile.

16. A remote water heater monitoring system comprising:
a communications port configured to operatively communicate with a plurality of client water heaters over a network, and to receive data related to the operation of a plurality of client water heaters, wherein the received data includes an impedance of a hot surface ignitor of a client water heater of the plurality of client water heaters, the hot surface ignitor configured to ignite a flame of the client water heater, wherein each of the client water heaters services a corresponding client building, and wherein each of the client water heaters is associated with a particular client account of a plurality of client accounts;
a memory configured to the received data related to the operation of the plurality of client water heaters;
a controller operatively coupled to the memory, wherein the controller includes a processor for processing at least some of the received data related to the operation of the plurality of client water heaters and to:
identify one or more baseline health parameters over time using the received data from two or more of the client water heaters;
based on the identified one or more baseline health parameters, identify an indication of health of at least a particular one of the client water heaters using the received data;
identify a degradation of the impedance of the hot surface ignitor of the client water heater over time;
estimate an end of life of the hot surface ignitor;
generate an alert for at least the particular one of the client water heaters when the indication of health meets one or more alert conditions;
associate the alert with the client account that corresponds to at least the particular one of the client water heaters;
provide access to the alert via the client account that corresponds to at least the particular one of the client water heaters; and
communicate one or more commands to at least the particular client water heater via the communications port, wherein the one or more commands include one or more operational commands that raises or lowers a temperature threshold for at least the particular client water heater.

17. A remote water heater monitoring system, comprising:
a communications port for sending and/or receiving data related to operation of two or more water heaters over a network, wherein the received data includes an impedance of a hot surface ignitor of a client water heater of the two or more client water heaters, the hot surface ignitor configured to ignite a flame of the client water heater;
a memory for storing the received data related to the operation of the two or more water heaters;
a controller operatively coupled to the communications port and the memory; and configured to:
process the received data related to the operation of the two or more water heaters to identify one or more trends over time related to at least one of: water heater performance or water heater reliability;
based on the identified one or more trends, identify for at least a particular water heater one or more of: (1) an abnormality in the operation of at least the particular water heater using the received data; or (2) a suggested action to improve the performance of at least the particular water heater using the received data;
identify a degradation of the impedance of the hot surface ignitor of the client water heater over time;
estimate an end of life of the hot surface ignitor;
generate an alert when an abnormality is identified in the operation of at least the particular water heater;
associate the alert with a client account of the remote water heater monitoring system that corresponds to at least the particular water heater;
provide access to the alert via the client account that corresponds to at least the particular water heater; and
communicate one or more commands to at least the particular client water heater via the communications port, wherein the one or more commands include one or more operational commands that raises or lowers a temperature threshold for at least the particular client water heater.

18. The remote water heater monitoring system of claim 17, wherein the controller is further configured to identify, for the particular water heater, a suggested action to improve the performance of the particular water heater, wherein the suggested action includes, one or more of:
power cycling the particular water heater;
removing particular matter from the particular water heater;
removing debris from a flue of the particular water heater;
manually setting a flue damper to an open position;
replacing an anode rod of the particular water heater;
replacing a hot surface ignitor of the particular water heater;
replacing a thermopile of the particular water heater;
replacing a gas valve of the particular water heater;
replacing a damper actuator of the particular water heater; and
replacing the particular water heater with another water heater.

* * * * *